United States Patent
Robles et al.

(10) Patent No.: US 11,232,384 B1
(45) Date of Patent: Jan. 25, 2022

(54) METHODS AND SYSTEMS FOR DETERMINING CYBER RELATED PROJECTS TO IMPLEMENT

(71) Applicant: THE BOSTON CONSULTING GROUP, INC., Boston, MA (US)

(72) Inventors: Ernesto Robles, New York, NY (US); Michael Coden, Riverdale, NY (US); Russell Schaefer, Arlington, VA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 16/517,280

(22) Filed: Jul. 19, 2019

(51) Int. Cl.
*G06Q 10/06* (2012.01)
*H04L 29/06* (2006.01)

(52) U.S. Cl.
CPC ... *G06Q 10/06375* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,601,587 B1 * | 12/2013 | Powell | | G06F 21/552 726/25 |
| 8,914,880 B2 * | 12/2014 | Lee | | G06F 21/577 726/22 |
| 9,294,498 B1 * | 3/2016 | Yampolskiy | | G06F 21/57 |
| 2009/0281864 A1 * | 11/2009 | Abercrombie | | G06Q 30/0283 705/7.37 |
| 2010/0153156 A1 * | 6/2010 | Guinta | | G06Q 10/0635 705/7.28 |
| 2011/0252479 A1 * | 10/2011 | Beresnevichiene | | G06F 21/577 726/25 |
| 2012/0004946 A1 * | 1/2012 | Blackwood | | G06Q 10/0635 705/7.28 |
| 2012/0011077 A1 * | 1/2012 | Bhagat | | G06Q 10/0635 705/317 |
| 2012/0191503 A1 * | 7/2012 | Heiman | | G06Q 30/02 705/7.28 |
| 2012/0232679 A1 * | 9/2012 | Abercrombie | | G06Q 10/04 700/44 |

(Continued)

FOREIGN PATENT DOCUMENTS

| | | | | |
|---|---|---|---|---|
| EP | 2498198 B1 * | 5/2017 | | G06F 21/554 |
| EP | 3343867 B1 * | 2/2020 | | H04L 63/1408 |

OTHER PUBLICATIONS

Abercrombire, Robert K., Frederick T. Sheldon, and Michael R. Grimaila. "A Systematic Comprehensive Computational Model for Stake Estimation in Mission Assurance-Applying Cyber Security Econometrics System (CSES) to Mission Assurance Analysis Protocol (MAAP)." IEEE, 2010. (Year: 2010).*

(Continued)

*Primary Examiner* — Matthew S Gart
*Assistant Examiner* — Derick J Holzmacher
(74) *Attorney, Agent, or Firm* — DLA Piper LLP (US)

(57) ABSTRACT

Methods and systems for determining cyber security related projects to implement. Cyber security related projects used to protect entity assets can be identified. A return on investment for each cyber security related project can be determined. An optimization programming problem algorithm can be solved to remove project redundancies. Cyber security related projects to implement can be determined.

18 Claims, 5 Drawing Sheets

MATRIX FOR CALCULATION OF PORTFOLIO REDUNDANCIES AND SYNERGIES

(56) References Cited

U.S. PATENT DOCUMENTS

| | | | | |
|---|---|---|---|---|
| 2013/0055404 | A1* | 2/2013 | Khalili | G06Q 10/06312 726/25 |
| 2013/0282426 | A1* | 10/2013 | Watters | G06Q 50/265 705/7.28 |
| 2014/0108089 | A1* | 4/2014 | Abercrombie | G06Q 10/0635 705/7.28 |
| 2015/0381649 | A1* | 12/2015 | Schultz | G06Q 40/08 726/25 |
| 2016/0012235 | A1* | 1/2016 | Lee | G06K 9/00442 726/25 |
| 2016/0205126 | A1* | 7/2016 | Boyer | H04L 43/0876 726/25 |
| 2016/0239665 | A1* | 8/2016 | Hamby | G06F 21/577 |
| 2016/0248800 | A1* | 8/2016 | Ng | G06Q 10/0635 |
| 2016/0261628 | A1* | 9/2016 | Doron | H04L 63/1458 |
| 2017/0346846 | A1* | 11/2017 | Findlay | H04L 63/1433 |
| 2018/0020023 | A1* | 1/2018 | Doron | H04L 63/1416 |
| 2018/0041533 | A1* | 2/2018 | Chesla | G06F 16/24578 |
| 2018/0069882 | A1* | 3/2018 | Vescio | G06Q 10/0635 |
| 2018/0124091 | A1* | 5/2018 | Sweeney | H04L 63/1425 |
| 2018/0189697 | A1* | 7/2018 | Thomson | G06Q 10/0635 |
| 2018/0375892 | A1* | 12/2018 | Ganor | G06F 3/04847 |
| 2019/0034845 | A1* | 1/2019 | Mo | G06Q 10/0635 |
| 2019/0052671 | A1* | 2/2019 | Doron | H04L 63/1458 |
| 2019/0098039 | A1* | 3/2019 | Gates | G06N 7/005 |
| 2019/0172073 | A1* | 6/2019 | Wiig | G06Q 30/018 |
| 2021/0234885 | A1* | 7/2021 | Campbell | H04L 41/16 |

OTHER PUBLICATIONS

Roy, Arpan, Dong Seong Kim, and Kishor S. Trivedi. "Cyber security analysis using attack countermeasure trees." Proceedings of the Sixth Annual Workshop on Cyber Security and Information Intelligence Research. 2010. (Year: 2010).*

Rjaibi, Neila, and Latifa Ben Arfa Rabai. "Maximizing Security Management Performance and Decisions with the MFC Cyber Security Model: e-learning case study." EAI Endorsed Transactions on e-Learning 4.15 (2017). (Year: 2017).*

Sheldon, Frederick T., Robert K. Abercrombie, and Ali Mili. "Methodology for evaluating security controls based on key performance indicators and stakeholder mission." 2009 42nd Hawaii International Conference on System Sciences. IEEE, 2009. (Year: 2009).*

Guan, Y., and H. Liao. "Measuring and Optimizing Cybersecurity Investments: A Quantitative Portfolio Approach." 2014 Industrial and Systems Engineering Research Conference. (Year: 2014).*

Sawik, Tadeusz. "Selection of optimal countermeasure portfolio in IT security planning." Decision Support Systems 55.1 (2013): 156-164. (Year: 2013).*

Musman, Scott. "Assessing prescriptive improvements to a system's cyber security and resilience." 2016 Annual IEEE Systems Conference (SysCon). IEEE, 2016. (Year: 2016).*

Zhuo, Yueran, and Senay Solak. "Cybersecurity investment optimization with risk: Insights for resource allocation." 2015 International Conference on Industrial Engineering and Operations Management (IEOM). IEEE, 2015. (Year: 2015).*

Solak, Senay. "Cybersecurity Investment Optimization with Risk: Insights for Resource Allocation." (2014). (Year: 2014).*

Aissa, Anis Ben, et al. "Defining and computing a value based cyber-security measure." Information Systems and e-Business Management 10.4 (2012): 433-453. (Year: 2012).*

Musman, Scott, and Andrew Turner. "A game theoretic approach to cyber security risk management." The Journal of Defense Modeling and Simulation 15.2 (2018): 127-146. (Year: 2018).*

Wyman, O., "Tamin Cyber Quantifying Cyber Risk Using a Structured Scenario Approach", Total 10 pages, (Jan. 2018).

"Built on the Fair Standard", URL: https://www.risklens.com/why-risklens/built-on-the-fair-standard/, Total 6 pages.

* cited by examiner

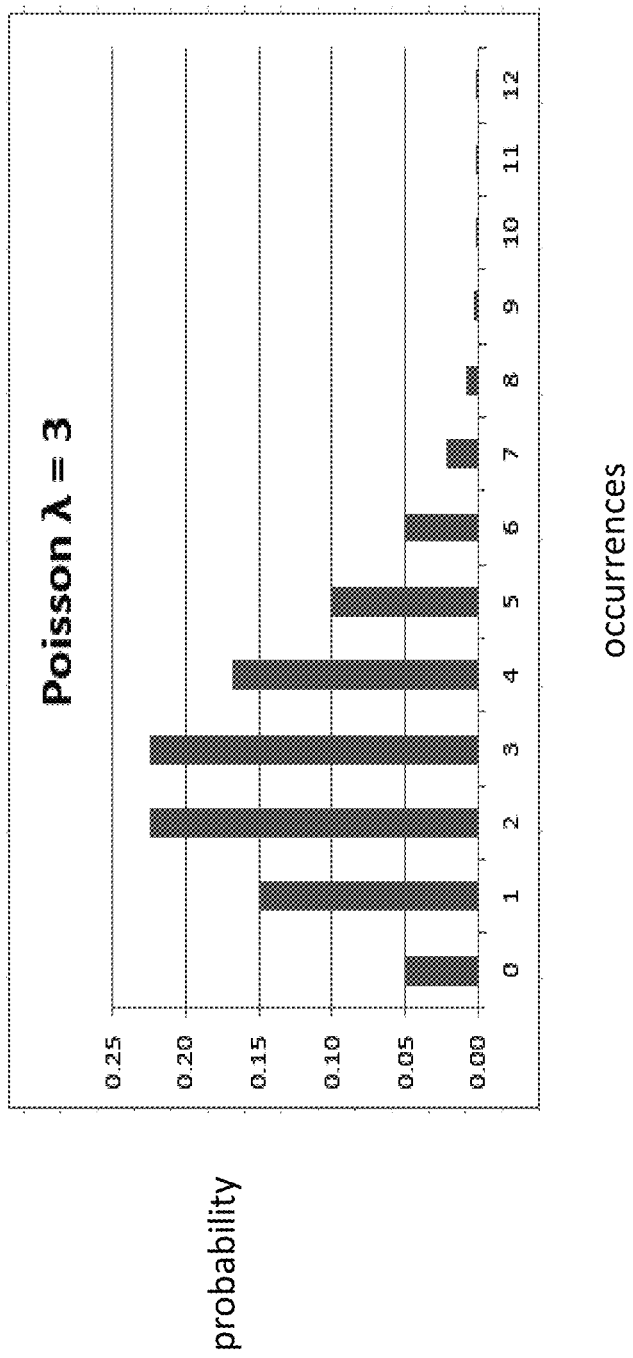
FIG. 1 – POISSON PROBABILITY DISTRIBUTION

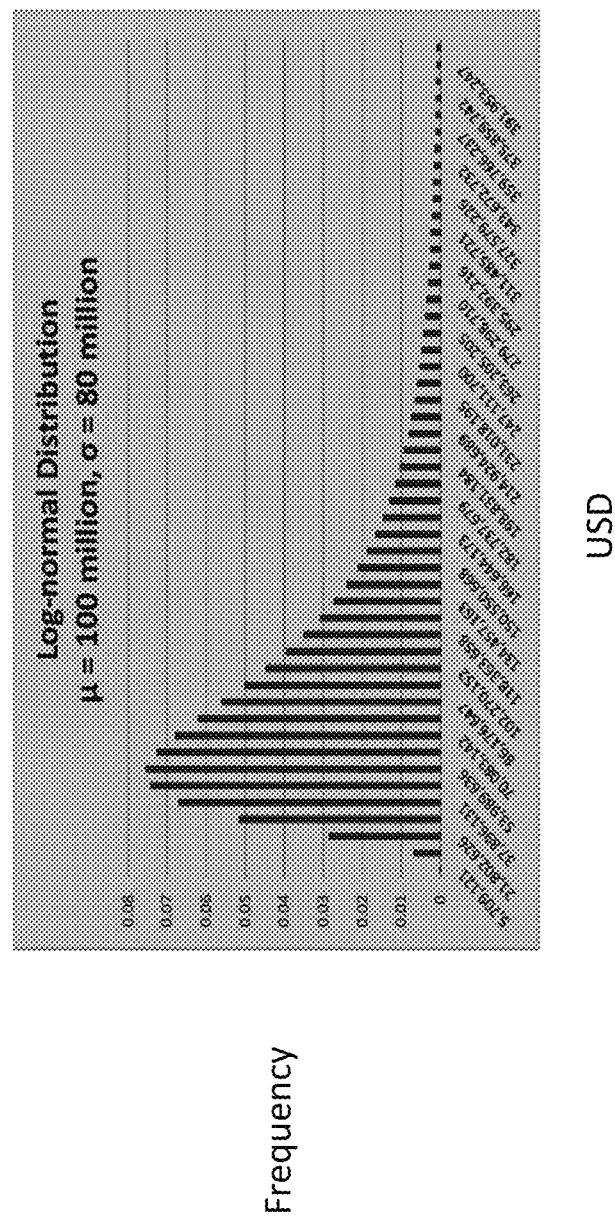
FIG. 2 – LOG NORMAL DISTRIBUTION

FIG. 3 – SCORECARD

| Definition | Probability per Month (Low End) | Probability per Month (High End) | Expected Frequency |
|---|---|---|---|
| Almost impossible | 0.0% | 0.0% | Less than once in 10 years |
| Rare | 0.0% | 0.8% | Between 1 per year and 1 per 10 years |
| Very unlikely | 0.8% | 10.0% | Between 1 per month and 1 per year |
| Unlikely | 10.0% | 50.0% | Between 1 and 5 per month |
| Likely | 50.0% | 90.0% | Between 5 and 9 per month |
| Very Likely | 90.0% | 100.0% | More than 9 per month |

FIG. 4 – MATRIX FOR CALCULATION OF PORTFOLIO REDUNDANCIES AND SYNERGIES

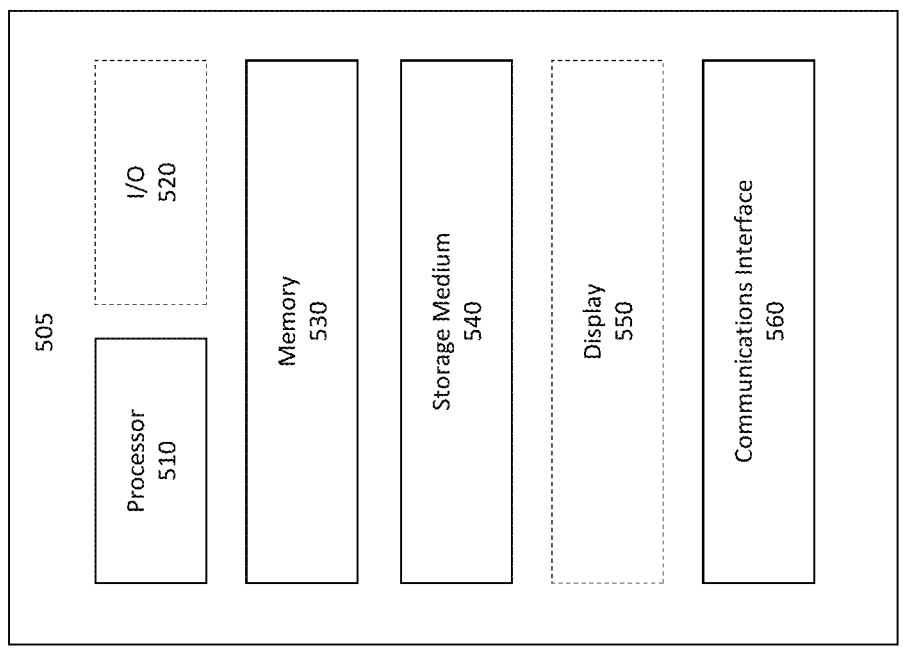
FIG. 5 – EXAMPLE COMPUTER

METHODS AND SYSTEMS FOR DETERMINING CYBER RELATED PROJECTS TO IMPLEMENT

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 1 illustrates a distribution of a Poisson probability distribution, according to embodiments of the present disclosure.

FIG. 2 illustrates a log-normal distribution, according to embodiments of the present disclosure.

FIG. 3 illustrates a scorecard that can estimate the probability of an event happening in any given month based on the expected frequency of that event, according to embodiments of the present disclosure.

FIG. 4 illustrates an example of a matrix that can be utilized for the calculation of both portfolio redundancies and synergies for a portfolio, according to embodiments of the present disclosure.

FIG. 5 illustrates an example computer, according to embodiments of the present disclosure.

The drawings are not necessarily to scale, or inclusive of all elements of a system, emphasis instead generally being placed upon illustrating the concepts, structures, and techniques sought to be protected herein.

BRIEF DESCRIPTION OF ASPECTS OF THE DISCLOSURE

By investing in cyber security projects, entities can reduce expected losses. Methods and Systems are disclosed herein for calculating the aggregate expected loss reduction from a portfolio of one or more cyber security related projects. Projects can include new and/or existing internal initiatives and/or market offerings. Projects can also include: tools and applications, internal initiatives, vendor solutions, frameworks, and other efforts to mitigate cyber security loss. In some embodiments, calculating the aggregate expected loss of a given portfolio of projects can compare distinct portfolios against each other in terms of Return on Investment (ROI). This approach can help management facing resource constraints to choose an optimal combination of projects from multiple projects in order to mitigate loss from cyber security events.

Quantification of cyber loss can include techniques that combine the likelihood of a cyber event with the impact of that event should it materialize. One example of such a technique is a Loss Distribution Approach (LDA). In an LDA framework such as that discussed in aspects of the disclosure, likelihood can be referred to as frequency and impact can be referred to as severity. The loss distribution approach (LDA) can be a process that uses frequency and severity distributions, and can be used to quantify a wide variety of cyber security threats. A scorecard approach can be a framework used to help assess the frequency and severity of these threats.

In some aspects of the disclosure, expected cyber loss can be calculated by combining frequency and severity. In addition, in some aspects, the expected loss reduction contributions of each selected project can be aggregated to a portfolio view. Furthermore, by considering the redundancies and synergies among selected projects, a more accurate portfolio level expected loss reduction can be calculated. For example, by removing project redundancies from expected loss reductions and reducing project costs through the identification of project synergies, a more accurate portfolio expected loss reduction can be estimated.

In some aspects of the disclosure, given a specific budget constraint, we can set up an integer optimization to select a subset of cyber security projects that will maximize the expected loss reduction from cyber security threats and help identify high ROI projects.

Loss Distribution Approach

In some aspects of the disclosure, an LDA approach can be used by an institution to calculate expected loss from operational risk. This technique first identifies a time horizon (e.g., one year, one month, one week, one day) where losses could occur from various operational risks. These operational risks can be separated into categories of business lines (e.g., corporate finance, sales & trading, retail banking, etc.) and risk types (e.g., internal fraud, external fraud, damage to physical assets, etc.). Expected loss from operational risk can then be calculated over the specified time period for each risk type within each business line. Within each business line/risk type pair, expected loss can be calculated through the convolution of frequency and severity distributions.

Frequency distributions can be forward looking and describe the probability that risk event(s) could happen. For example, a Poisson probability distribution can be used for frequency. The Poisson probability distribution can be a discrete probability distribution that gives the probability of a certain number of events occurring over a specified period of time. The mean and variance of the distribution can be given by one parameter, lambda ($\lambda$). Equation 1 describes how the probability of k events happening is calculated within a Poisson distribution for a given lambda.

$$p_Y(k) = \frac{e^{-\lambda}\lambda^k}{k!}, k = 0, 1, 2, \quad (1)$$

FIG. 1 illustrates a distribution of a Poisson probability distribution when lambda is equal to three. For example, FIG. 1 can illustrate the probability distribution categorized by an expected three successful cyberattacks on the sales and trading arm of an international investment bank per year.

Severity distributions can be forward looking, and can describe the loss that would be associated with a realized event categorized by the frequency distribution described above. The log-normal distribution can be used within the field of operational risk to express the range of potential losses. The mean and variance of the log-normal distribution can be mu $\mu$ and sigma squared $\sigma^2$, respectively. Equation (2) calculates the probability of a loss (x) being realized from a log normal distribution with a given mean and standard deviation.

$$p(x) = \frac{1}{\sigma\sqrt{2\pi}}\frac{1}{x}\exp\left[-\frac{1}{2}\left(\frac{\ln x - m}{\sigma}\right)^2\right] \quad (2)$$

FIG. 2 can illustrate a log-normal distribution when $\mu$ is 100 million and $\sigma$ is 80 million.

Estimation of Portfolio Losses

The loss frequency and loss distribution can be combined to simulate the expected loss distribution. This can be called convolution. A Monte Carlo simulation can be used to estimate the aggregate distribution of losses, with K simulations. The sequence of calculations can be as follows:

1) For k=1, ..., K
   a. Simulate the number of events N using a Poisson distribution
   b. Simulate the severities $X_1, \ldots, X_N$ from the severity distributions
   c. Calculate the aggregate losses $$Z_s = \sum_{i=1}^{N} X_i$$

The distribution of losses can then be used to compute the mean, VaR (q), and the expected shortfall, where q is the VaR threshold (e.g., the $95^{th}$ or the $99^{th}$ percentile).

The expected shortfall can be given by $$ES(q)=E(Z|Z>VaR(q)), \qquad (3)$$

or, equivalently, the average losses above the calculated VaR.

Techniques for Deriving Parameters for Frequency and Severity Distributions

A challenge facing operational risk professionals is the lack of data required for the estimation of the parameters of the distributions described above. Given the idiosyncratic nature of operational risks, historical data, even if available, may not necessarily be a good predictor of future events. Accordingly, many practitioners may rely on expert judgement to arrive at the parameters of the requisite distributions. Below we describe an example of how to translate expert judgment into quantitative estimates.

A scorecard can be a common framework used to translate expert judgement into probabilities. First, a discrete number of opportunities can be identified per given period that are subject to cyber risk loss. For example, we could assume that 10 opportunities per month are subject to a cyber event. The scorecard in FIG. 3 could be presented to experts to estimate the probability of an event happening in any given month based on the expected frequency of that event.

Scorecards can be good for calibrating simple discrete frequency distributions such as the Poisson probability distribution where there is only one parameter to calculate (e.g., lambda). Continuous distributions (e.g., the log-normal distribution) that can require a mean and standard deviation, can use a more sophisticated approach. For example, a technique that calculates the parameters of a log-normal distribution by soliciting a cyber loss bound parameter can be used to determine lower and upper bounds. The bounds can be calculated such that the lower end of the bound and the upper end of the bound can be determined by a given percentage of the total loss curve that the two bounds would encapsulate.

For example, an expert could be asked what loss amounts she expected 80 percent of the potential loss to fall between. If the two loss amounts are believed to be 20 million and 160 million, then the bound parameter would be 80, the lower bound would be 20 and the upper bound would be 160. These three numbers (e.g., 20, 80, and 160) can be used to parameterize a log-normal distribution.

For example, the mean of the log-normal distribution can be described by Equation 4:

$$\mu_i = \frac{\log(LB_i) + \log(UB_i)}{2}, \; LB_i = \text{Lower } z \text{ Loss Bound,} \qquad (4)$$
$$UB_i = \text{Upper } z \text{ Loss Bound}$$

where $$\log zz(z)=2f(x,\mu,\sigma)$$

and $$f(x, \mu, \sigma) = \frac{1}{\sqrt{2\pi}\sigma} e^{-\frac{(x-\mu)^2}{2\sigma^2}},$$

normal distribution function
so that $$\log zz(z)=2f(x,0,1)$$

Assuming a mean of 0 and unit variance, we can obtain the following:

$$logzz(z) = \frac{2}{\sqrt{2\pi}} e^{-\frac{\left(\frac{z+\frac{100-z}{2}}{100}\right)^2}{2}}$$

The standard deviation can be given by the following:

$$\sigma_i = \frac{\log(UB_i) - \log(LB_i)}{logzz(z)} \qquad (5)$$

Portfolio Dynamics Project

Many cyber loss quantification approaches focus on the relationships and/or dependencies among the various cyber risks. In some aspects of the disclosure, we can model the relationships and/or dependencies among the various cyber risk mitigants.

Attempts to quantify the benefits of investing in cyber related projects can assume that the aggregated benefits of all of the projects can be merely a sum of the individual benefits. In practice, two projects may seem attractive on their own, but because they reduce expected loss redundantly, it may not be appropriate to include both in the same portfolio. Similarly, there may be two projects that individually are not attractive, but are synergistic and together they contribute more to expected loss reduction than individually.

By understanding the dynamics of each project within the project portfolio can a more accurate portfolio expected loss reduction be estimated. Here we can utilize redundancy and/or synergy matrices to adjust gross expected loss reduction to arrive at net expected loss reduction.

FIG. 4 illustrates an example of a matrix that an be utilized for the calculation of both portfolio redundancies and synergies for a portfolio considering 30 potential projects for inclusion.

Only the lower left triangle of the matrix in FIG. 4 is necessary, as the upper triangle can be necessarily symmetric and can contain the same information. Unlike a correlation matrix, the diagonal elements are zeros (not 1s) as each project cannot be either synergistic or redundant with itself.

Each pairwise element can show the percentage synergy or redundancy (e.g., as a percent of combined expected loss reduction) that would need to be added or subtracted from the inclusion of that pair in the portfolio.

The weighted average redundancies or synergies within the portfolio can be calculated using the following formula:

$$\rho_{av} = \frac{2\sum_{i=1}^{N}\sum_{j>1}^{N} w_i w_j \rho_{i,j}}{1 - \sum_{i=1}^{N} w_i^2} \quad (6)$$

Here $\rho_{i,j}$ can be the full synergy or redundancy matrix, and $w_i$, $w_j$ can be the weights of the individual project costs within the portfolio of project costs to which the relevant synergy/redundancy coefficient relates.

The calculated redundancies and synergies of the portfolio of project costs can then be used to obtain the ROI of investing in all of the cyber related projects. The ROI can be the total expected reduction in losses from cyber security threats less the cost of implementing the cyber security projects, or the return, divided by the cost of implementing the cyber security projects, or the investment. The total expected loss reduction can be the sum of all expected loss reductions less the fraction of portfolio redundancies calculated using equation (6). The cost of implementing all of the projects can be the sum of all project costs less the fraction of portfolio synergies calculated using equation (6). The resulting ROI can be:

$$ROI = \frac{LR - TC}{TC}, \quad (7)$$

where LR can be the expected loss reduction across all projects, adjusted for redundancies, and TC can be the total cost of all projects, adjusted for synergies.

Using equation (6) to calculate project redundancies, the expected loss reduction can be:

$$LR = (1 - \rho_{av(red)})\sum_{i=1}^{N} r_i, \quad (8)$$

where $r_i$ can be the expected loss reduction for an individual project and $\rho_{av(red)}$ can be the total portfolio redundancy coefficient.

Equation (6) can also be used to calculate the total cost. The total cost can be:

$$TC = (1 - \rho_{av(syn)})\sum_{i=1}^{N} c_i, \quad (9)$$

where $c_i$ can be the cost of an individual project, and $\rho_{av(syn)}$ can be the total portfolio synergy coefficient.

This ROI approach can assume that the organization that is implementing these cyber security projects has a budget that can invest in every project in the portfolio of cyber security projects. Of course, most companies have a limited budget and can only select a subset of projects. Thus, in some aspects of the disclosure, an optimization can be set up to select the optimal set of projects that will maximize the expected loss reduction.

Portfolio Expected Loss Reduction

Equation (6) can be explained at a more general level as follows:

The project portfolio optimized expected loss reduction model (LR) can use the following variables as inputs:

$$LR = F(r_i, c_i, \rho_{avr}, \rho_{avs}) \quad (10)$$

where:

$r_i$ can be the expected loss reduction for an individual cyber security project $c_i$ can be the cost of an individual project $\rho_{avr}$ can be the full portfolio redundancy matrix; and $\rho_{avs}$ can be the full portfolio synergy matrix.

In more generalized terms, $\rho_{avr}$ and $\rho_{avs}$ can be functions of the following:

$$\rho_{avx} = F(w_i, w_j, \rho_{i,j}), \quad (11)$$

where $\rho_{i,j}$ can be the synergy or redundancy associated with each pair of cybersecurity projects i, j, and $x = r$ or $s$ where:

r can indicate a redundancy matrix and s can indicate a synergy matrix; and $w_i$, $w_j$ can be the weights of the individual project costs within the portfolio of project costs to which the relevant redundancy or synergy coefficient relates.

Maximizing the Portfolio Expected Loss Reduction

The optimization can be set up as an integer programming problem, and the optimization engine that can be used to solve the problem can be an evolutionary algorithm. The following steps describe an example set-up for the optimization:

1. Objective Function: Maximize the expected loss reduction, or $$LR_{Max} = \text{Max}\left[(1 - \rho_{av(red)})\sum_{i=1}^{N} r_i\right].$$

2. Decision Variables: A value of 1 can be used to select projects that contribute to maximizing the expected loss reduction; a value of 0 can be used to designate projects that will not be implemented.

3. Constraint: The constraint can be the budget that has been set aside to invest in cyber security projects.

The result of the optimization can give us a subset of projects that can maximize the expected loss reduction given the budget that has been set aside for cyber security projects.

Computer Configuration

Methods described herein may represent processing that occurs within a system for managing a configuration of an application. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 510 in FIG. 5) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

FIG. 5 illustrates an example computer 505. Computer 505 can include a processor 510 suitable for the execution of a computer program, and can include, by way of example, both general and special purpose microprocessors, and any one or more processor of any kind of digital computer. A processor can receive instructions and data from a memory 530 (e.g., a read only memory or a random access memory or both). Processor 510 can execute instructions and the memory 530 can store instructions and data. A computer can include, or be operatively coupled to receive data from or transfer data to, or both, a storage medium 540 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 510 and the memory 530 can be supplemented by, or incorporated in, special purpose logic circuitry.

The computer 505 can also include an input/output 520, a display 550, and a communications interface 560.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the steps, components, formulas, etc. may be used in a different order or configuration than that described in the specification and/or shown in the drawings.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method, comprising:
using a processor to receive instructions and data from a memory in order to perform processing associated with identifying cyber security related projects used to protect entity assets;
using the processor to perform processing associated with determining a return on investment for each cyber security related project, wherein the return on investment comprises a probability of an entity asset being compromised and a cost of the cyber security related project, and wherein the return on investment is determined using expected loss reduction information and project cost information;
using the processor to perform processing associated with solving an optimization programming problem algorithm, using an optimization engine comprising an evolutionary algorithm, to remove project redundancies to select a subset of cyber security related projects that maximize expected loss reduction from cyber security related threats, or designate cyber security related projects that will not be implemented, or both; and
using the processor to determine a subset of cyber security related projects to implement from the cyber security related projects using determined project redundancies, wherein the subset of cyber security related projects achieves a greatest impact at a minimal cost or a pre-determined cost or both, the greatest impact comprising total expected loss and/or cyber maturity;
wherein the optimization programming problem algorithm uses a full project portfolio redundancy matrix that calculates a weighted average redundancy of a candidate portfolio to identify a net expected loss reduction of a portfolio of candidate projects; and wherein expected loss comprises a probability of a successful attack and an impact of the successful attack; and displaying the subset of cyber security related projects.

2. The method of claim 1, comprising:

performing processing associated with providing redundancy information related to how each cyber security related project relates to each other cyber security related project.

3. The method of claim 1, comprising:

performing processing associated with determining a loss risk for each asset, wherein the loss risk comprises a cost of an asset being compromised.

4. The method of claim 1, wherein mutually exclusive cyber security related projects are considered when determining the project redundancies.

5. The method of claim 1, wherein overlapping cyber security related projects are considered when determining the project redundancies.

6. A system, comprising:

a processor configured for:

determining a return on investment for each cyber security related project, wherein the return on investment comprises a probability of an entity asset being compromised and a cost of the cyber security related project, and wherein the return on investment is determined using expected loss reduction information and project cost information;

solving an optimization programming problem algorithm, using an optimization engine comprising an evolutionary algorithm, to remove project redundancies to select a subset of cyber security related projects that maximize expected loss reduction from cyber security threats, or designate cyber security related projects that will not be implemented, or both;

determining a subset of cyber security related projects to implement from the cyber security related projects using determined redundancies, wherein the subset of cyber security related projects achieves a greatest impact at a minimal cost or a pre-determined cost or both, the greatest impact comprising total expected loss and/or cyber maturity;

wherein the optimization programming problem algorithm uses a full project portfolio redundancy matrix that calculates a weighted average redundancy of a candidate portfolio to identify a net expected loss reduction of a portfolio of candidate projects; and wherein expected loss comprises a probability of a successful attack and an impact of the successful attack; and displaying the subset of cyber security related projects.

7. The system of claim 6, wherein the processor is configured for:

performing processing associated with providing redundancy information related to how each cyber security related project relates to each other cyber security related project.

8. The system of claim 6, wherein the processor is configured for:

performing processing associated with determining a loss risk for each asset, wherein the loss risk comprises a cost of an asset being compromised.

9. The system of claim 6, wherein mutually exclusive cyber security related projects are considered when determining the project redundancies.

10. The method of claim 1, wherein the optimization programming problem algorithm comprises an objective function used to maximize the expected loss reduction.

11. The method of claim 1, wherein the optimization programming problem algorithm comprises decision variables to select cyber security related projects that contribute to maximizing the expected loss reduction, or to designate projects that will not be implemented, or both.

12. The method of claim 1, wherein the optimization programming problem algorithm comprises constraints comprising a budget for cyber security related projects.

13. The method of claim 1, wherein a solution to the optimization programming problem algorithm comprises a subset of cyber security related projects that maximizes the expected loss reduction given a budget for cyber security related projects.

14. The system of claim 6, wherein the optimization programming problem algorithm comprises an objective function used to maximize the expected loss reduction.

15. The system of claim 6, wherein the optimization programming problem algorithm comprises decision variables to select cyber security related projects that contribute to maximizing the expected loss reduction, or to designate projects that will not be implemented, or both.

16. The system of claim 6, wherein the optimization programming problem algorithm comprises constraints comprising a budget for cyber security related projects.

17. The system of claim 6, wherein a solution to the optimization programming problem algorithm comprises a subset of cyber security related projects that maximizes the expected loss reduction given a budget for the cyber security related projects.

18. The system of claim 6, wherein overlapping cyber security related projects are considered when determining the project redundancies.

* * * * *